(12) United States Patent
Choi et al.

(10) Patent No.: US 11,205,247 B2
(45) Date of Patent: Dec. 21, 2021

(54) METHOD AND APPARATUS FOR ENHANCING VIDEO FRAME RESOLUTION

(71) Applicant: LG ELECTRONICS INC., Seoul (KR)

(72) Inventors: Hyun Dae Choi, Seoul (KR); Seung Hwan Moon, Siheung-si (KR); Young Kwon Kim, Seoul (KR); Keum Sung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 16/711,001

(22) Filed: Dec. 11, 2019

(65) Prior Publication Data
US 2021/0097646 A1    Apr. 1, 2021

(30) Foreign Application Priority Data
Sep. 26, 2019  (KR) .................. 10-2019-0119073

(51) Int. Cl.
*G06T 3/40* (2006.01)
*G06N 20/20* (2019.01)
*G06N 3/04* (2006.01)
*G06N 3/08* (2006.01)
*G06T 5/50* (2006.01)

(52) U.S. Cl.
CPC ......... *G06T 3/4046* (2013.01); *G06N 3/0454* (2013.01); *G06N 3/08* (2013.01); *G06N 20/20* (2019.01); *G06T 3/4053* (2013.01); *G06T 5/50* (2013.01); *G06T 2207/10016* (2013.01); *G06T 2207/20016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2018/0129918 A1* | 5/2018 | Wang | H04N 19/172 |
| 2018/0338159 A1* | 11/2018 | Kapoor | H04N 5/23232 |
| 2019/0026538 A1* | 1/2019 | Wang | G06K 9/4642 |
| 2019/0139205 A1* | 5/2019 | El-Khamy | G06K 9/6256 |

FOREIGN PATENT DOCUMENTS

| | | |
|---|---|---|
| KR | 10-2018-0126362 A | 11/2018 |
| KR | 10-2019-0059157 A | 5/2019 |

* cited by examiner

*Primary Examiner* — Jiangeng Sun
(74) *Attorney, Agent, or Firm* — Birch, Stewart, Kolasch & Birch, LLP

(57) ABSTRACT

A method for enhancing video frame resolution according to one embodiment of the present disclosure may include loading video data including a plurality of frames having low resolution; selecting, from the group of artificial neural networks for image processing, artificial neural networks for image processing having different complexity to apply to two different frames of a video; and generating a high resolution frame by processing each frame of the video according to the selected artificial neural networks for image processing. A neural network for image processing according to one embodiment of the present disclosure may be a deep neural network generated via machine learning, and an input and output of the video may take place in an Internet of Things environment using a 5G network.

12 Claims, 12 Drawing Sheets

FIG. 2
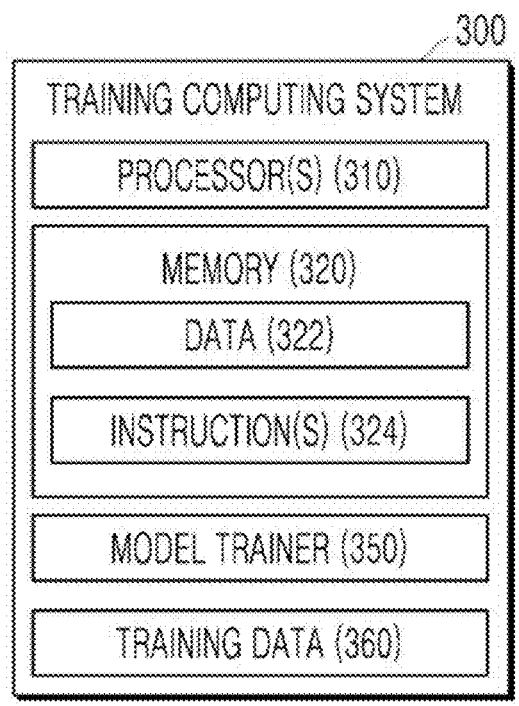
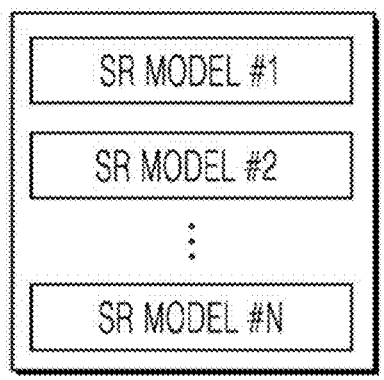
GROUP OF SR MODELS FOR EACH COMPLEXITY

METHOD AND APPARATUS FOR ENHANCING VIDEO FRAME RESOLUTION

CROSS-REFERENCE TO RELATED APPLICATION

Pursuant to 35 U.S.C. § 119(a), this application claims the benefit of earlier filing date and right of priority to Korean Patent Application No. 10-2019-0119073, filed on Sep. 26, 2019, the contents of which are hereby incorporated by reference herein in its entirety.

BACKGROUND

1. Technical Field

The present disclosure relates to a method and apparatus for enhancing video frame resolution. More specifically, the present disclosure relates to a method and apparatus for generating a high resolution video frame, capable of improving processing speed and efficiency by using a plurality of neural networks for image processing on a video frame, to achieve super resolution imaging.

2. Description of Related Art

Image processing technologies are technologies related to a method for performing specific operations on an image to increase a quality of the image or to extract specific information from the image.

The image processing technologies are technologies capable of being widely used in various fields. That is, the image processing technologies are core technologies that are indispensable in various fields, such as autonomous vehicles, security monitoring systems, video communications, and high quality video transmissions.

With the development of high resolution image sensors, 5G communication networks, and artificial intelligence technologies, the image processing technologies have also improved. Technologies for converting each frame of a low resolution image and video into a high resolution image by using a deep neural network have been attempted in recent years.

Related Art 1 discloses a technology of sequentially applying a recurrent neural network (RNN) and a convolutional neural network (CNN) to a plurality of input frames constituting a video, when performing a super resolution processing on the video.

Meanwhile, Related Art 1 discloses the technology of sequentially applying the RNN and the CNN to the input frames, without simultaneously inputting successive frames into a neural network, to address discrete artifacts between a plurality of frames, but has a disadvantage in that since the same type of CNN is applied to all frames, a large amount of computations may be needed to process a video super resolution when the complexity of the applied CNN is high.

Related Art 2 discloses a technology of utilizing spatial-temporal information on previous and next adjacent frames without performing a movement compensation process, but has a disadvantage in that it is also limited to applying the same type of CNN to all frames.

In order to address the disadvantages as described above, there is a need for a solution capable of effectively generating the high resolution image by appropriately applying, to various frames of the video, neural network models trained in various ways.

The above-described related art is technical information that the inventor holds for deriving the present disclosure or is acquired in the derivation process of the present disclosure, and is not necessarily a known technology disclosed to the general public before the application of the present disclosure.

RELATED ART DOCUMENTS

Related Art 1: Korean Patent Application Publication No. 10-2018-0126362 (published on Nov. 27, 2018)
Related Art 2: Korean Patent Application Publication No. 10-2019-0059157 (published on May 30, 2019)

SUMMARY OF THE INVENTION

One embodiment of the present disclosure is directed to addressing a disadvantage in the art that since a resolution enhancement process is performed using only one given neural network for all frames of a video, an excessive amount of computations is needed in a super resolution processing of the video.

In addition, one embodiment of the present disclosure is directed to addressing a disadvantage in the art that since a super resolution process is performed using the same neural network for all frames without considering contents of the frames, the super resolution process is unable to be efficiently performed.

In addition, one embodiment of the present disclosure is directed to addressing a disadvantage in the art that since, regardless of a user's interest, neural networks having high complexity are applied to even frames that do not have a high need for resolution enhancement, unnecessary waste of computing power is caused and an overall super resolution processing speed is slowed down.

In addition, one embodiment of the present disclosure is directed to addressing a disadvantage in the art that since, regardless of a frame of a video in which a user is interested, the same frame resolution enhancement method is used for the video, a frame of sufficiently high quality is unable to be provided despite sufficient processing power and processing time.

One embodiment of the present disclosure may provide a method and apparatus for enhancing video frame resolution, capable of improving performance and efficiency of resolution enhancement, by applying neural networks for image processing having different complexity to a plurality of low resolution frames of a video to achieve resolution enhancement.

Another embodiment of the present disclosure may provide a method and apparatus for enhancing video frame resolution, capable of improving performance and efficiency of resolution enhancement, by applying both a single image super resolution (SISR) model having good resolution enhancement performance and a multiple images super resolution model having good resolution enhancement efficiency.

Yet another embodiment of the present disclosure may provide a method and apparatus for enhancing video frame resolution, capable of improving performance and efficiency of resolution enhancement to reflect a viewer's interest, by applying, based on a scene change rate of a video frame, neural networks for image processing having different complexity to achieve resolution enhancement.

Yet another embodiment of the present disclosure may provide a method and apparatus for enhancing video frame resolution, capable of improving performance and efficiency of resolution enhancement, without having viewers notice a drop in image quality, by applying, based on a scene change of a video frame, neural networks for image processing having different complexity to achieve resolution enhancement.

A method for enhancing video frame resolution according to one embodiment of the present disclosure may include loading video data including a plurality of frames having low resolution; selecting, from the group of artificial neural networks for image processing, artificial neural networks for image processing to be applied to each frame of the video data, wherein the artificial neural networks for image processing having different complexity may be applied to at least two different frames; and generating a high resolution frame for each frame of the video data by processing each frame according to the selected artificial neural networks for image processing.

In addition, in the method for enhancing video frame resolution according to one embodiment of the present disclosure, the selecting the artificial neural networks for image processing may include selecting the artificial neural networks for image processing to be applied to a first group of frames corresponding to a preset periodic interval, among the plurality of frames, wherein the artificial neural networks for image processing to be applied to the first group of frames may have higher complexity than the artificial neural networks for image processing to be applied to a second group of frames not corresponding to the periodic interval.

Here, the method for enhancing video frame resolution according to one embodiment of the present disclosure may further include determining a degree of scene change of a frame to be processed relative to a previous frame, prior to the selecting the artificial neural networks for image processing, wherein the selecting the artificial neural networks for image processing may include determining whether to set the frame to be processed as a reference frame of the periodic interval, based on the degree of scene change.

In addition, the generating the high resolution frame may include obtaining the high resolution frame by utilizing, as inputs to the artificial neural networks for image processing, the frame to be processed and neighboring frames within a preset neighboring interval from the frame to be processed, based on a result of determining whether the frame to be processed is a frame of the second group of frames.

Here, the neighboring frames may be frames having a degree of scene change less than or equal to a predetermined criterion relative to the frame to be processed.

In addition, in the method for enhancing video frame resolution according to one embodiment of the present disclosure, the selecting the artificial neural networks for image processing may further include determining the degree of scene change of the frame to be processed relative to the previous frame; and changing the periodic interval based on the degree of scene change.

Here, the determining the degree of scene change of the frame to be processed relative to the previous frame may include identifying an object in the frame to be processed; determining a degree of movement of the object relative to the previous frame; and changing the periodic interval based on the degree of movement.

In addition, the generating the high resolution frame may include obtaining a temporary high resolution frame by utilizing, as inputs to the artificial neural networks for image processing, the frame to be processed and the neighboring frames within a preset neighboring interval from the frame to be processed, based on a result of determining whether the frame to be processed is a frame of the second group of frames; and obtaining a resulting high resolution frame for the frame to be processed, by synthesizing the temporary high resolution frame and the high resolution frame obtained by processing the previous frame of the frame to be processed, based on the degree of scene change.

In addition, in the method for enhancing video frame resolution according to one embodiment of the present disclosure, the selecting the artificial neural networks for image processing may include determining the degree of scene change of the frame to be processed relative to the previous frame; and selecting the artificial neural networks for image processing to be applied to a frame having a degree of scene change equal to or greater than the predetermined criterion, wherein the artificial neural networks for image processing to be applied to the frame may have higher complexity than the artificial neural networks for image processing to be applied to the first group of frames.

In addition, the method for enhancing video frame resolution according to one embodiment of the present disclosure may further include obtaining the video data by decoding compressed video data, prior to the loading the video data, wherein the selecting the artificial neural networks for image processing may include selecting the artificial neural networks for image processing to be applied to a third group of frames resulted from decoding an intra frame of the compressed video data, among the plurality of frames, wherein the artificial neural networks for image processing to be applied to the third group of frames may have higher complexity than the artificial neural networks for image processing to be applied to a fourth group of frames resulted from decoding an inter frame of the compressed video data.

Here, the generating the high resolution frame may include selecting the neighboring frames within the neighboring interval from a frame of the fourth group of frames, wherein the neighboring interval may be set such that at least one frame of the third group of frames is included in the neighboring frames; and obtaining a high resolution frame by utilizing, as inputs to the artificial neural networks for image processing, the at least one frame and the neighboring frames.

In addition, in the method for enhancing video frame resolution according to one embodiment of the present disclosure, the selecting the artificial neural networks for image processing may include determining the degree of scene change of the frame to be processed relative to the previous frame; and selecting the artificial neural networks for image processing to be applied to a frame having the degree of scene change equal to or greater than the predetermined criterion, wherein the artificial neural networks for image processing to be applied to the frame may have higher complexity than the artificial neural networks for image processing to be applied to a frame having the degree of scene change less than the predetermined criterion.

A computer-readable recording medium having stored thereon a method for enhancing video frame resolution according to one embodiment of the present disclosure may be a computer-readable recording medium having stored thereon a computer program for executing any one of the methods described above.

An apparatus for enhancing video frame resolution according to one embodiment of the present disclosure may include a processor; and a memory configured to be electrically coupled to the processor and to store at least one instruction executed in the processor and parameters of artificial neural networks for image processing, wherein the memory may be configured to store instructions that, when executed by the processor, cause the processor to load video data including a plurality of frames having low resolution, and to generate a high resolution frame by applying the artificial neural networks for image processing to the frames, and wherein the instructions may cause the processor to apply the artificial neural networks for image processing having different complexity to at least two different frames among the frames of the video data.

Here, the instructions may cause the processor to select the artificial neural networks for image processing to be applied to a first group of frames corresponding to a preset periodic interval, wherein the artificial neural networks for image processing to be applied to the first group of frames may have higher complexity than the artificial neural networks for image processing to be applied to a second group of frames not corresponding to the periodic interval.

Here, the instructions cause the processor to obtain a high resolution frame by utilizing, as inputs to the artificial neural networks for image processing, the frame to be processed and neighboring frames within a preset neighboring interval from the frame to be processed, based on a result of determining whether the frame to be processed is a frame of the second group of frames.

An apparatus for enhancing video frame resolution according to another embodiment of the present disclosure may include a processor; and a memory configured to be electrically coupled to the processor and to store at least one instruction executed in the processor and parameters of artificial neural networks for image processing, wherein the memory may be configured to store instructions that cause the processor to load a frame to be processed from video data including a plurality of frames having low resolution, and to generate a high resolution frame by transferring the frame to be processed to an artificial neural network instance generated based on any one of a plurality of artificial neural network models for image processing having different complexity.

Here, the instructions may cause the processor to generate a plurality of artificial neural network instances based on the plurality of artificial neural network models for image processing, and to transfer the frame to be processed to any one of the plurality of artificial neural network instances.

In addition, in the apparatus for enhancing video frame resolution according to one embodiment of the present disclosure, the instructions may cause the processor to selectively generate, based on the frame to be processed, an artificial neural network instance based on any one of the plurality of artificial neural network models for image processing, and to transfer the frame to be processed to the generated artificial neural network instance.

According to an apparatus and method for enhancing video frame resolution according to one embodiment of the present disclosure, since neural networks for image processing having different complexity may be selected and used according to a type of a video frame, it is possible to improve performance and efficiency of resolution enhancement when converting a resolution of a video to high resolution.

In addition, according to one embodiment of the present disclosure, since both a single image super resolution (SISR) model having good resolution enhancement performance and a multiple images super resolution model having good resolution enhancement efficiency may be applied, it is possible to improve performance and efficiency of resolution enhancement when converting a resolution of a video to high resolution.

In addition, according to one embodiment of the present disclosure, since neural networks for image processing having different complexity may be applied based on a degree of scene change of a video frame to achieve resolution enhancement, it is possible to convert a resolution of a video frame to high resolution to reflect a viewer's interest.

In addition, according to one embodiment of the present disclosure, since neural networks for image processing having different complexity may be applied based on a scene change rate of a video frame to achieve resolution enhancement, it is possible to improve performance and efficiency of resolution enhancement, without having viewers notice a drop in image quality.

The effects of the present disclosure are not limited to those mentioned above, and other effects not mentioned can be clearly understood by those skilled in the art from the following description.

BRIEF DESCRIPTION OF THE DRAWINGS

FIG. 2 illustrates a system for generating neural networks for video frame processing according to one embodiment of the present disclosure.

DETAILED DESCRIPTION OF THE EMBODIMENTS

Figure 1:
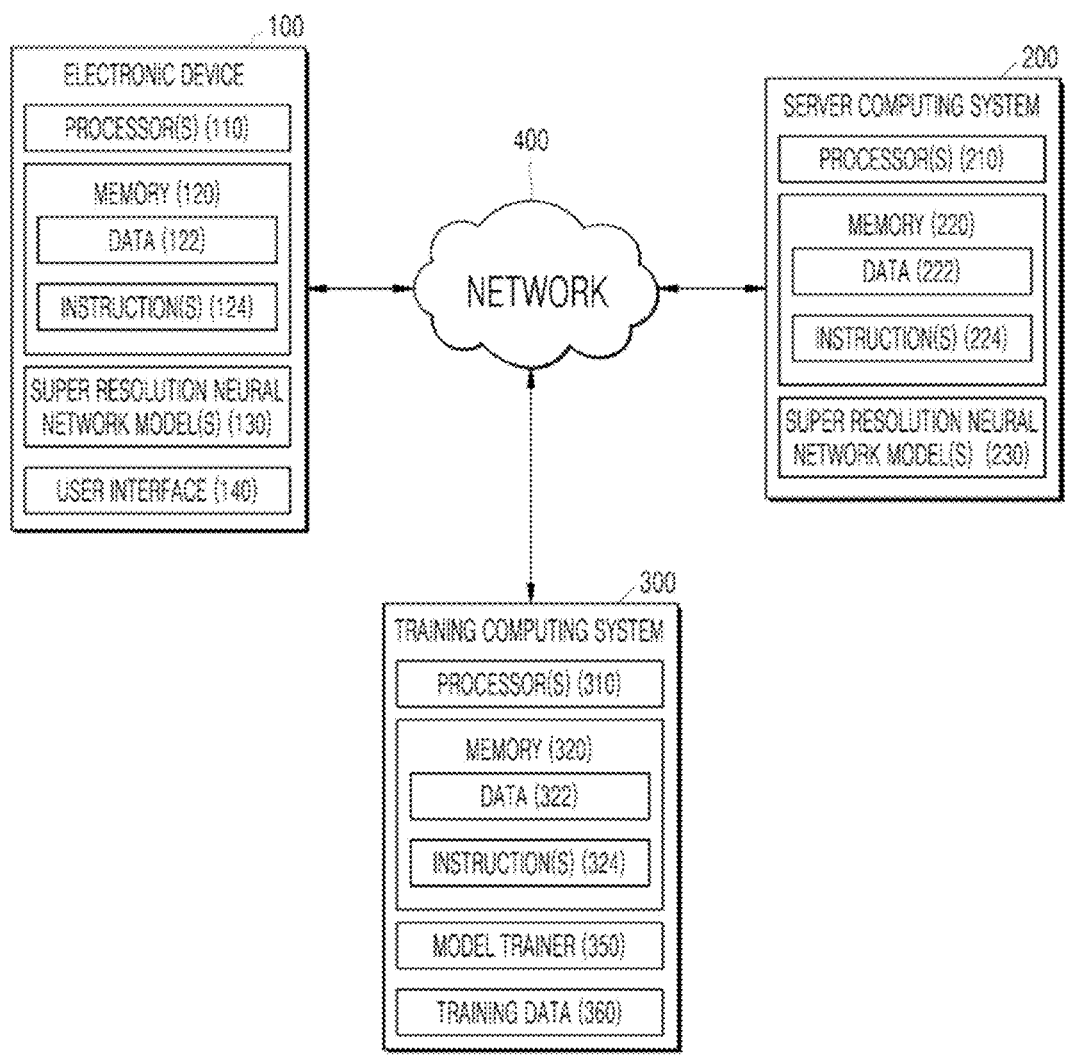
FIG. 1 is an example diagram of an environment for performing a method for enhancing video frame resolution according to one embodiment of the present disclosure.

The advantages and features of the present disclosure and methods to achieve them will be apparent from the embodiments described below in detail in conjunction with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular embodiments only and is not intended to be limiting. As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally used only to distinguish one element from another.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

FIG. 1 is an example diagram of an environment for performing a method for enhancing video frame resolution according to one embodiment of the present disclosure.

The environment for performing the method for enhancing video frame resolution according to one embodiment of the present disclosure may include an electronic device 100, a server computing system 200, a training computing system 300, and a network 400 that enables them to communicate with each other.

The electronic device 100 may support object-to-object intelligent communication (for example, Internet of Things (IoT), Internet of Everything (IoE), and Internet of Small Things (IoST)), and may support, for example, machine-to-machine (M2M) communication and device-to-device (D2D) communication.

The electronic device 100 may determine an image resolution enhancement method by using big data, artificial intelligence (AI) algorithms, or machine learning algorithms in a 5G environment connected for the IoT.

The electronic device 100 may be any type of computing device, such as a personal computer, a smartphone, a tablet, a game console, a projector, a wearable device (for example, smart glasses, and a head mounted display (HMD)), a set top box (STB), a desktop computer, a digital signage, a smart television, and a network attached storage (NAS), and may be implemented as, for example, a stationary or mobile device.

That is, the electronic device 100 may be implemented as various forms of home appliances for household use, and may be also applied to a stationary or mobile robot.

The electronic device 100 may include a wireless communication unit capable of transmitting or receiving data in the 5G environment connected for the IoT. The wireless communication unit may include at least one of a broadcast receiving module, a mobile communication module, a wireless Internet module, a short-range communication module, and a location information module.

The broadcast receiving module receives broadcast signals or broadcast-related information through a broadcast channel from an external broadcast management server.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multiple Access (CDMA), Code Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)) and 5G communication.

The wireless Internet module refers to a module for wireless Internet access, and may be built in or external to the electronic device 100. The wireless Internet module may be configured to transmit/receive a wireless signal on a communication network according to wireless Internet technologies.

The wireless Internet technologies are, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module is for short-range communication, and may support short-range communication by using at least one of BluetoothTM, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (Wireless USB) technologies.

The location information module is a module for obtaining the location (or the current location) of a mobile electronic device, and its representative examples include a global positioning system (GPS) module or a Wi-Fi module. For example, the electronic device may utilize the GPS module to obtain a location of the mobile electronic device by using a signal transmitted from a GPS satellite.

The electronic device 100 may include one or more processors 110 and a memory 120.

The one or more processors 110 may include all types of devices, such as an MCU, a GPU, and an AI accelerator chip, that are capable of processing data. Here, the "processor" may represent, for example, a hardware-embedded data processing device having a physically structured circuit to execute functions expressed as instructions or codes included in a program.

Examples of the hardware-embedded data processing device may include a processing device, such as a microprocessor, a central processing unit (CPU), a processor core, a multiprocessor, an application-specific integrated circuit (ASIC), and a field programmable gate array (FPGA). However, the scope of the present disclosure is not limited thereto.

The processor 110 may determine or predict at least one executable operation of the electronic device 100 based on information generated or determined by using data analysis and machine learning algorithms. To this end, the processor 180 may control the electronic device such that the electronic device executes a predicted operation or a preferable operation among the at least one executable operation.

The processor 110 may perform various functions to implement intelligent emulation (that is, a knowledge based system, an inference system, and a knowledge acquisition system). This may be applied to various types of systems (for example, fuzzy logic systems) including, for example, adaptive systems, machine learning systems, and artificial neural networks.

The electronic device 100 may include an output unit for outputting data resulted from processing the execution results of the processor 110.

The output unit is for generating an output such as a visual output, an audible output, or a haptic output, and may include at least one of a display, an acoustic output module, a haptic module, or a light output unit.

The display is configured to display (output) information processed in the electronic device 100. For example, the display may display execution screen information of an application program executed in the electronic device 100, or user interface (UI) or graphic user interface (GUI) information according to the execution screen information.

Since the display may form a mutually layered structure with a touch sensor or may be formed integrally with the touch sensor, the display may implement a touch screen. The touch screen may function as a user input tool to provide an input interface between the electronic device 100 and the user, and at the same time may provide an output interface between the electronic device 100 and the user.

The memory 120 may include one or more non-transitory storage media, such as RAM, ROM, EEPROM, EPROM, flash memory devices, and magnetic disks. The memory 120 may store data 122, as well as instructions 124 that when executed by the processor 110, cause the electronic device 100 to perform operations.

In addition, the electronic device 100 may include a user interface 140 to receive commands from the user and to transmit output information to the user. The user interface 140 may include various input tools, such as a keyboard, a mouse, a touch screen, a microphone, and a camera; and various output tools, such as a monitor, a speaker, and a display.

The electronic device 100 may include an interface unit that serves as a path to various types of external devices connected to the electronic device 100. This interface unit may include at least one of a wired/wireless headset port, an external charger port, a wired/wireless data port, a memory card port, a port for connecting a device having an identification module, an audio input/output (I/O) port, a video input/output (I/O) port, or an earphone port. In response to an external device being connected to the interface unit, the electronic device 100 may appropriately control the connected external device.

The user may select a video to be processed in the electronic device 100 via the user interface 140. For example, the user may select a video that needs to be enhanced in resolution, via, for example, a mouse, a keyboard, and a touch screen.

The user interface 140 may include a mechanical type input tool (or a mechanical key, such as a button located on a front, rear or side surface of the electronic device 100, a dome switch, a jog wheel, and a jog switch) and a touch type input tool. As one example, the touch type input tool may include a virtual key, a soft key, or a visual key displayed on the touch screen via software process, or may include a touch key disposed on any portion other than the touch screen.

In one embodiment, the electronic device 100 may also store or include super resolution models 130 to which an artificial intelligence technology is applied. For example, the super resolution models 130 to which the artificial intelligence technology is applied may be or include various trained models such as deep neural networks or other types of machine learning models.

In this specification, the artificial neural network which is trained using training data to determine parameters may be referred to as a learning model or a trained model.

Meanwhile, the super resolution models 130 may be implemented as hardware, software, or a combination of hardware and software, and in situations where the super resolution models are partially or entirely implemented as software, at least one instruction constituting the super resolution model may be stored in the memory 120.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

The Bayesian network may include a model that represents the probabilistic relationship (conditional independence) among a set of variables. The Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, the deep neural network including a plurality of hidden layers between the input layer and the output layer can be a representative artificial neural network that implements deep learning, which is a type of machine learning technology.

An ANN can be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and label corresponding to the training data together may form a single training set, and as such, they may be inputted to the artificial neural network as a training set.

The training data may exhibit a number of features, and the training data being labeled with the labels may be interpreted as the features exhibited by the training data being labeled with the labels. In such a situation, the training data can represent the feature of an input object in the form of a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve to fool the discriminator as effectively as possible, while the discriminator evolves to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

The Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. Momentum and NAG in SGD may include a method that increases optimization accuracy by adjusting the step size. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good trained model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The super resolution models 130 to which the above-mentioned artificial intelligence technology is applied may be first generated through a training step by the training computing system 300, and may be stored in the server computing system 200 and then transmitted to the electronic device 100 via the network 400.

The training computing system 300 or the server computing system 200 may transmit the super resolution model trained by machine learning or deep learning, to the electronic device 100 periodically or upon request.

The super resolution models 130 may be neural networks for image processing, and may be trained models trained to process a frame (for example, an image) of the video to output a high resolution video when a low resolution video is inputted.

Typically, the super resolution models 130 may be stored in the electronic device 100 in a state that may be applied to the low resolution video after completing a training step in the training computing system 300. However, in some embodiments, the super resolution models 130 may also be updated or upgraded via additional training in the electronic device 100.

Meanwhile, the super resolution models 130 stored in the electronic device 100 may be some of the super resolution models 130 generated in the training computing system 300, and where necessary, new super resolution models may be generated in the training computing system 300 and delivered to the electronic device 100.

As another example, the super resolution models 130 may be stored in the server computing system 200, not in the electronic device 100, and may provide functions necessary for the electronic device 100 in the form of a streaming service.

The server computing system 200 may include processors 210 and a memory 220, and may generally have greater processing power and memory capacity than the electronic device 100. Accordingly, according to the implementation of the system, heavy super resolution models 230 requiring more processing power for an application may be configured to be stored in the server computing system 200, while lightweight super resolution models 130 requiring less processing power for the application may be configured to be stored in the electronic device 100.

The electronic device 100 may complexly apply, according to the property of a frame to be processed, different super resolution models having different complexity among various stored super resolution models 130 relating to the video. In one example, the electronic device 100 may apply the lightweight super resolution model having low complexity to some frames of the video, and may apply the heavy super resolution model having high complexity to some other frames of the video. In another example, the electronic device 100 may be configured to use the super resolution model 130 stored therein when the lightweight super resolution model 130 is needed, and to use the super resolution model 230 stored in the server computing system 200 when the heavy super resolution model 230 is needed.

The super resolution models 130, 230 stored in the electronic device 100 or the server computing system 200 may be neural networks for image processing generated by the training computing system 300.

FIG. 2 illustrates a system for generating neural networks for image processing according to one embodiment of the present disclosure.

A training computing system 300 may include one or more processors 310 and a memory 320. In addition, the training computing system 300 may include a model trainer 350 and training data 360 for training machine learning models.

The training computing system 300 may be implemented as not only a single server but also, for example, a plurality of sets of servers, a cloud server, or a combination thereof.

That is, the training computing system 300 may be configured in a plurality to constitute a set of training computing systems (or a cloud server), and at least one training computing system 300 included in the set of training computing systems may analyze or learn data by distributed processing in order to derive a result.

The training computing system 300 may generate a plurality of super resolution models having different complexity or structure via the model trainer 350.

For example, the neural networks for image processing having a hidden layer formed of two layers may be used for a frame in which the user is not interested, but the neural networks for image processing having the hidden layer formed of four layers may be used for a frame in which the user is interested.

The training computing system 300, depending on an initial configuration of a neural network, may generate the neural networks for image processing having high complexity that take a longer processing time but provide improved performance, or may generate the neural networks for image processing having low complexity that take a shorter processing time but provide lower performance.

As such, the group of super resolution models may be formed including the super resolution models having various complexities that may be used in various frames.

Here, the complexity of the neural networks for image processing is determined according to, for example, the number of input nodes, the number of features, the number of channels, and the number of hidden layers. Therefore, the complexity of the neural networks for image processing may be understood to be higher as the number of features, the number of channels, and the number of hidden layers are higher. In addition, the neural networks may be referred to as heavy as the number of channels and the number of hidden layers are increased. In addition, the complexity of the neural networks may be referred to as the dimensionality of the neural networks.

The higher the complexity of the neural networks, the better the performance of video frame resolution enhancement, but the longer the time required for frame processing. On the contrary, the lower the complexity of the neural networks, the lower the performance of video frame resolution enhancement, but the shorter the time required for frame processing.

The training computing system 300 may generate, via the model trainer 350, a plurality of super resolution models requiring different numbers of input frames.

The super resolution model of the training computing system 300 may generate a single image super resolution (SISR) model that produces a high resolution image by using a single low resolution image, and a multiple images super resolution model that produces the high resolution image by using a plurality of low resolution images.

In addition, the training computing system 300 may generate, even from the same single image super resolution model, a plurality of single image super resolution models having different complexity in configuration, such as the number of input nodes, the number of features, the number of channels, and the number of hidden layers, and may similarly generate, even from the multiple images super resolution model, a plurality of multiple images super resolution models having different complexity.

In one example, the training computing system 300 may generate a plurality of super resolution models based on the training data 360.

When the training data 360 is a low resolution image of a person which is labeled as a high resolution image, the training computing system 300 may generate a super resolution model that may optimally enhance the resolution of the image of the person. Since an ability to identify a face of a person is important in the super resolution processing of CCTV video data, the super resolution models having different complexity and performance may be generated that may enhance the resolution of the image of the person.

For example, the training computing system 300 may be the neural networks for video frame processing that are trained to enhance the resolution of the image of the person, may generate a group of super resolution models including the neural network having a larger number of hidden layers than the neural network of the super resolution model applied to most frames, and may generate the group of the super resolution models including neural networks each having a different number of hidden layers.

Figure 3:
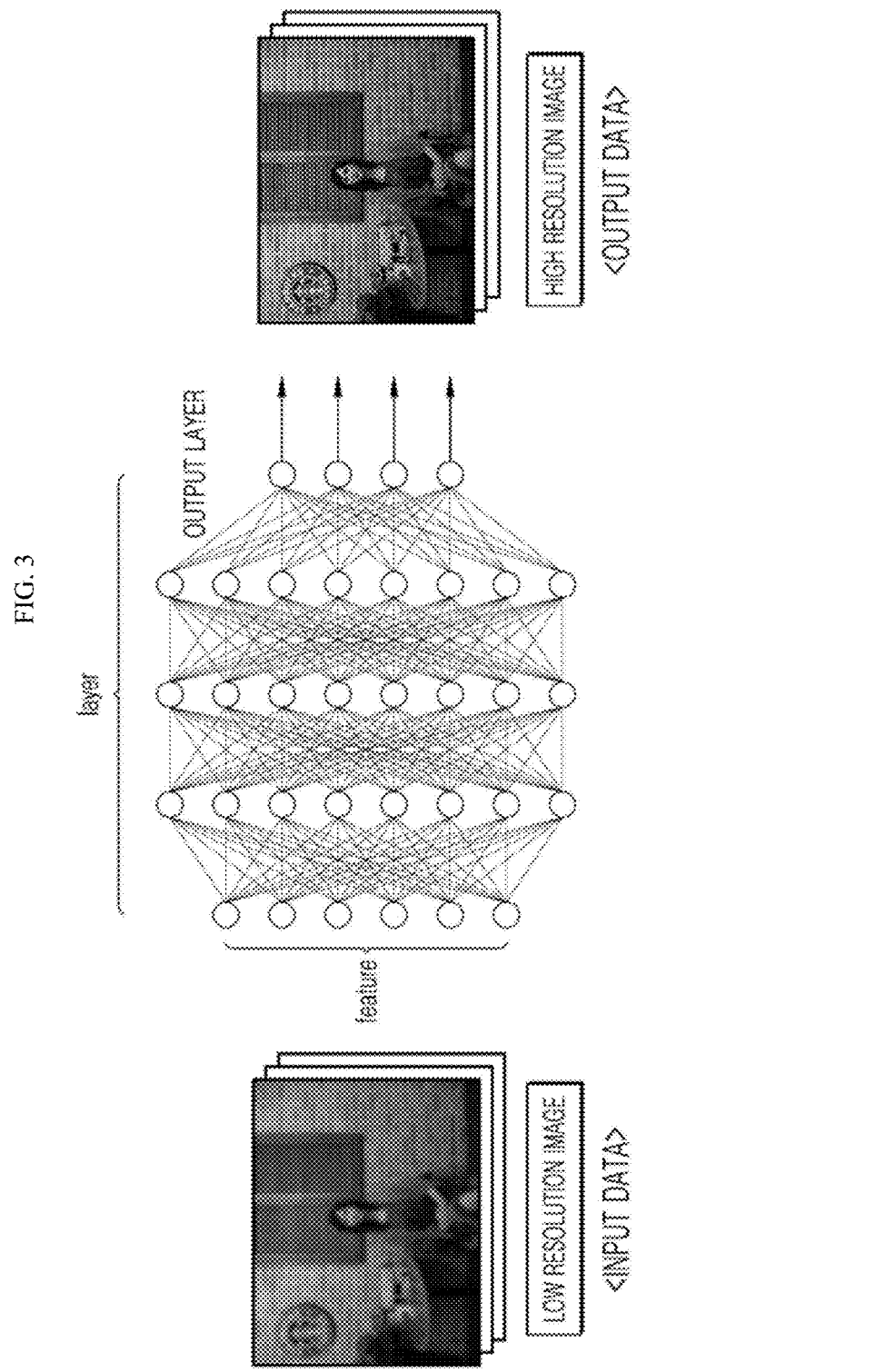
FIG. 3 is a view illustrating a neural network for video frame processing according to one embodiment of the present disclosure.

FIG. 3 is a view illustrating a neural network for image processing according to one embodiment of the present disclosure.

The neural network for image processing may be composed of an input layer, a hidden layer, and an output layer. The number of input nodes is determined according to the number of features, and as the number of nodes increases, the complexity or dimensionality of the neural network increases. In addition, as the number of hidden layers increases, the complexity or dimensionality of the neural network increases.

The number of features, the number of input nodes, the number of hidden layers, and the number of nodes in each layer may be determined by a designer of the neural network, and as the complexity of the neural network increases, the neural network may take more processing time but achieve better performance.

Once the initial configuration of the neural network is designed, the neural network may be trained with the training data. In order to implement the neural network to enhance video frame resolution, a high resolution original image and a low resolution version of the original image are needed. By collecting high resolution original images and then blurring and downsampling the images, the low resolution images corresponding to the high resolution original images may be prepared.

By labeling the high resolution original images corresponding to the low resolution images, the training data capable of training the neural networks to enhance the image resolution may be prepared.

By training the neural networks with a large amount of training data in a supervised learning manner, when the low resolution image is inputted, a neural network model for image processing capable of outputting the high resolution image may be generated.

Here, by using, as the training data, training data including images of a specific type of object, the neural networks for image processing optimized to enhance the image resolution of the object may be obtained.

Meanwhile, the processing speed and performance of the neural network for image processing may be in a trade-off relationship, and the designer may generate the neural networks for various super resolution models having different processing speed and performance, by changing the initial configuration of the neural network.

The super resolution model may be implemented as hardware, software, or a combination of hardware and software, and in situations where the super resolution model is partially or entirely implemented as software, at least one instruction or parameter constituting the super resolution models may be stored in the memory 120, 220, 320.

Figure 4:
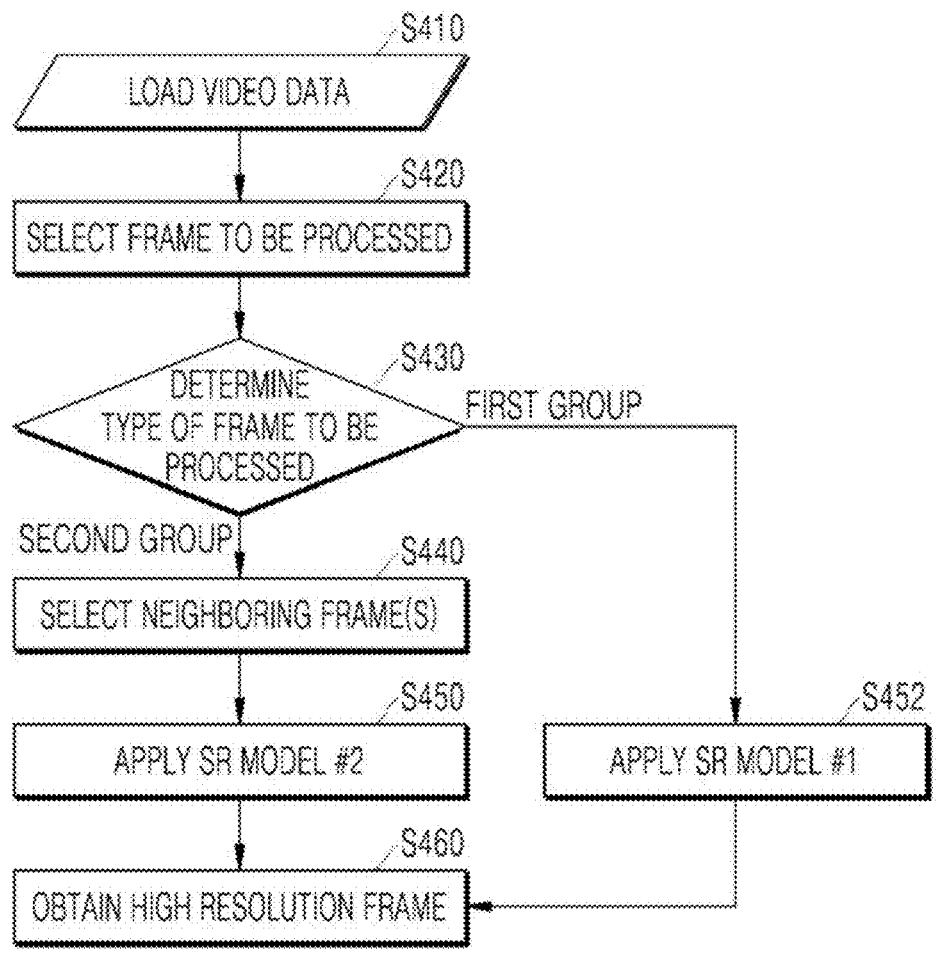
FIG. 4 is a sequence diagram illustrating a method for enhancing video frame resolution according to one embodiment of the present disclosure.

FIG. 4 is a sequence diagram illustrating a method for enhancing video frame resolution according to one embodiment of the present disclosure.

Figure 5:
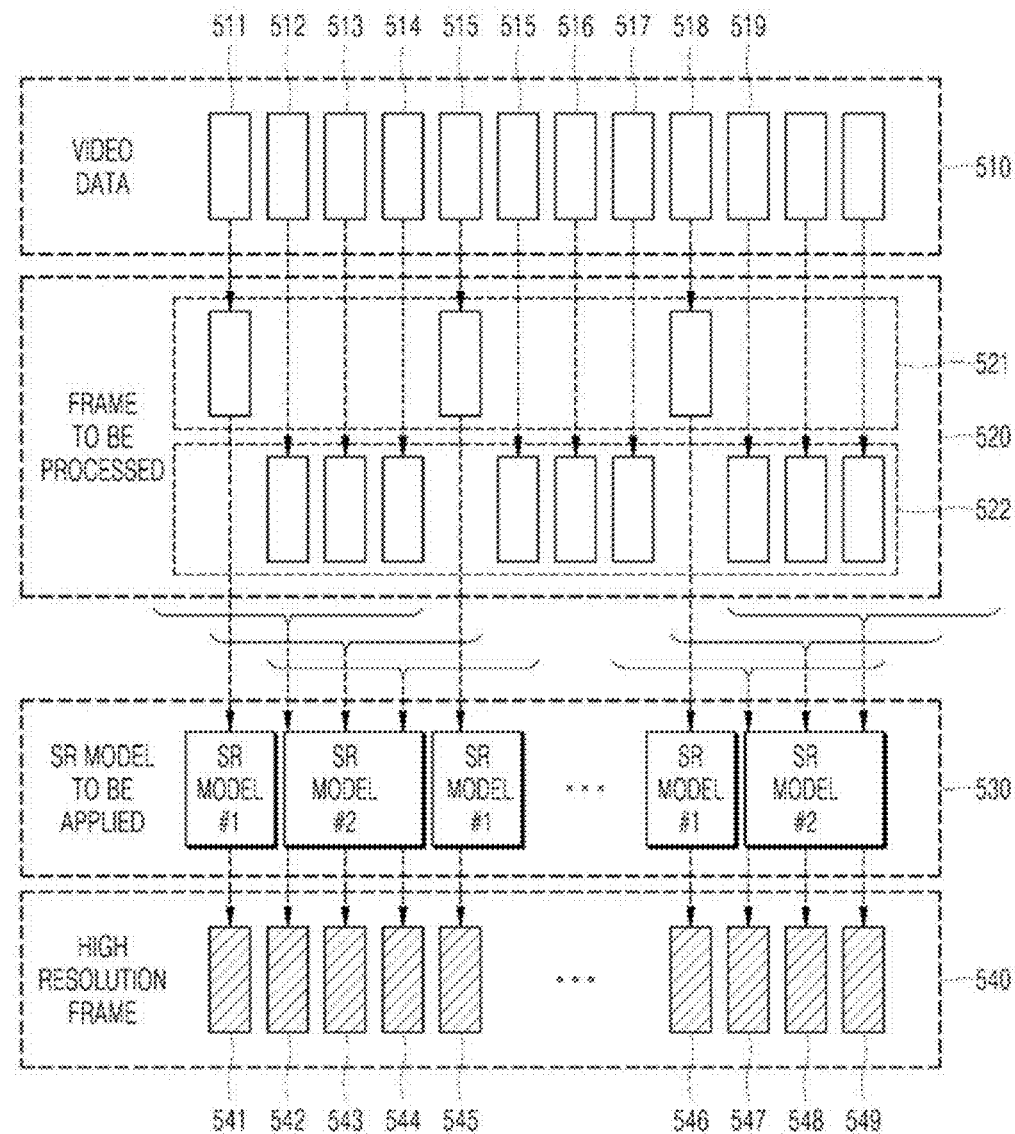
FIG. 5 is a view illustrating a process of performing, on a video, a method for enhancing video frame resolution, according to one embodiment of the present disclosure.

In addition, FIG. 5 is a view illustrating a process of performing, on video data, the method for enhancing video frame resolution according to one embodiment of the present disclosure as described with reference to FIG. 4.

The apparatus for enhancing video frame resolution may have the same configuration as the electronic device 100 as described with reference to FIG. 1. First, the apparatus for enhancing video frame resolution may load video data 510 (S410). The video data may be data about that which is photographed by a device equipped with a camera, or may be data received via wired or wireless communication from an external device.

In addition, the loading of the video data includes temporarily or non-temporarily storing, in a memory, streaming data received in a real time streaming manner via the wired or wireless communication to apply the super resolution model to the streaming data.

The apparatus for enhancing video frame resolution may be a common user terminal, such as a computer, a smartphone, and a tablet. In addition, the apparatus for enhancing video frame resolution may be a server-like apparatus which receives the video data, performs resolution enhancement on each frame of the video data, and transmits the results to the connected external device, such as a monitor, a projector, a display device, and a television.

The video data 510 may be composed of a plurality of frames, and the apparatus for enhancing video frame resolution may select a frame to be processed, according to an order of the loaded video data (S420).

The apparatus for enhancing video frame resolution may apply the super resolution model for a single frame to some frames 521 of the video data 510, and apply the super resolution model for multiple frames to the remaining frames 522 thereof. When the multiple frames super resolution is applied, a plurality of frames may be loaded into a buffer, and then be applied with the super resolution model.

The embodiment of the present disclosure described with reference to FIG. 5 assumes that the apparatus for enhancing video frame resolution stores two super resolution models having different complexity, and that super resolution model 1 has higher complexity than super resolution model 2.

The apparatus for enhancing video frame resolution may select a frame to be processed and then determine a type of the frame to be processed (S430).

For example, the apparatus for enhancing video frame resolution may be preset to apply super resolution model 1 having high complexity to the frames 521 corresponding to a preset periodic interval, but to apply super resolution model 2 having lower complexity than super resolution model 1 to the frames 522 not corresponding to the periodic interval.

In another embodiment, the apparatus for enhancing video frame resolution may determine a type of a frame to be processed, according to a nature of the frame before decoding the video data (S430).

For example, the apparatus for enhancing video frame resolution may be preset to apply super resolution model 1 having high complexity to the frame to be processed when the frame to be processed corresponds to an intra frame not referring to neighboring frames before decoding, but to apply super resolution model 2 having lower complexity than super resolution model 1 to inter frames referring to the neighboring frames.

Accordingly, even when encoding by adaptively applying a key frame, the super resolution model having a high resolution enhancement effect may be applied to an important key frame.

When the type of the frame to be processed is determined based on the periodic interval, the periodic interval may be represented by the number of frames or by time. For example, when it is predetermined that super resolution model 1 is applied every specific number of frames, the apparatus for enhancing video frame resolution may determine a type of the current frame to be processed by counting the number of frames to be processed that are loaded. When it is predetermined that super resolution model 1 is applied every specific time interval, the apparatus for enhancing video frame resolution may determine the type of the current frame to be processed by considering the number of frames of the loading video data per second. The embodiment of FIG. 5 describes the embodiment of the present disclosure under the assumption that the periodic interval is set to four frames.

Referring to FIG. 5, since a first frame 511 to be processed is a frame corresponding to a start of the periodic interval, among the frames of the video data, a high resolution frame may be obtained by performing the single image super resolution processing that applies (S452) super resolution model 1 having high complexity (S460).

Since a second frame 512 to be processed is a frame not corresponding to the periodic interval as a result of determining (S430) the type of the frame, super resolution model 2 having lower complexity than super resolution model 1 may be selected as a super resolution model to be applied.

The apparatus for enhancing video frame resolution may apply, to the frame not corresponding to the periodic interval, the single image super resolution model, or the multiple images super resolution model that simultaneously uses, as an input, the neighboring frames of the frame to be processed.

In one example, the apparatus for enhancing video frame resolution may apply the multiple images super resolution model to the frames not corresponding to the periodic interval, in order to complement applying the super resolution model with high computing speed and low complexity to the frames.

When super resolution model 2, which is the multiple images super resolution model, is applied (S450), the apparatus for enhancing video frame resolution may select the neighboring frames to be inputted to the super resolution model, along with the frame to be processed (S440).

The interval (neighboring interval) between the frame to be processed and the neighboring frame inputted to the multiple images super resolution model may be preset, and the neighboring interval may be represented by the number of frames or by a time interval from the frame to be processed.

In the embodiment of FIG. 5, since the neighboring interval is set to two frames, it is assumed that the previous two frames and the next two frames of the frame to be processed are inputted to super resolution model 2 as the neighboring frames along with the frame to be processed. In such a situation, the apparatus for enhancing video frame resolution may obtain the high resolution frame by loading the neighboring frames into a buffer and then inputting the selected frames to super resolution model 2 via the multiple images super resolution model (S460).

In another embodiment, when the multiple images super resolution model is applied to the inter frame, the apparatus for enhancing video frame resolution may set the neighboring interval such that at least one intra frame may also be inputted in applying the multiple images super resolution model to all inter frames.

A size of the buffer may be set depending on a preset size of the neighboring interval. Accordingly, after the high resolution frame for the frame to be processed is obtained, that frame to be processed may not be unloaded from the buffer to be used as an input to the multiple images super resolution model in obtaining the high resolution frame for the next frame to be processed.

Even when the neighboring frame is a frame corresponding to the preset neighboring interval for selecting the neighboring frames to be inputted to the multiple images super resolution model, the apparatus for enhancing video frame resolution may exclude the neighboring frame from the input to the multiple images super resolution model based on a predetermined criterion.

For example, when the frame to be processed is a second frame 513 and the neighboring interval is set to two frames, the previous two frames 511, 512 and the next two frames 514, 515 of the frame to be processed may correspond to the neighboring interval. However, when specific frame 514 has a high degree of scene change relative to the frame 513 to be processed, the apparatus for enhancing video frame resolution may only use, as the input to the multiple images super resolution model, the frames 511, 512, 513, 515, excluding the specific frame 514.

The degree of scene change between the frames may be measured based on, for example, a brightness change and color histogram change between the frames to be compared, or a value resulted from reflecting a weighting factor onto an amount of brightness change and an amount of color histogram change, respectively; the sum of pixel values in a subtraction image between the frames to be compared or the number of pixels equal to or greater than a certain value in the subtraction image; and changes of an object that are recognized by performing object recognition on the frames.

Accordingly, even when the super resolution model having low complexity is applied, a high level of high resolution frames may be obtained by using, as the input, a plurality of images, and the results of applying the super resolution model may be prevented from being impaired, by excluding, from the input to the multiple images super resolution model, a neighboring frame having a high degree of scene change relative to the frame to be processed.

Referring back to FIG. 5, when the preset periodic interval is four frames, the super resolution model having high complexity may be applied to the frames 511, 515, 519 of the video data corresponding to the periodic interval, and the super resolution model having low complexity may be applied to the remaining frames of the video data. The super resolution model having low complexity may be the multiple images super resolution model.

Although the embodiment of the present disclosure described with reference to FIG. 5 assumes that the apparatus for enhancing video frame resolution stores two super resolution models having different complexity, the apparatus for enhancing video frame resolution may obtain the high resolution frame by applying more than two super resolution models to the frames of the video data.

When the apparatus for enhancing video frame resolution is implemented as the electronic device 100 shown in FIG. 1, the apparatus for enhancing video frame resolution may use, in computing processing for applying the super resolution model, an AI dedicated core separately implemented in the processor 110. Alternatively, a computation for applying the super resolution model may be processed by using an AI accelerator implemented as a separate chip from an application processor (AP) of a mobile device or a CPU of the electronic device. In such a situation, the apparatus for enhancing video frame resolution may generate an artificial neural network instance based on the artificial neural network model for image processing, and perform the super resolution process by transferring the frame to be processed to the generated instance.

In one embodiment, when the memory capacity for calculating the parameters for the super resolution model is sufficient to operate only one super resolution model, the AI dedicated core or the AI accelerator may perform the super resolution process by selectively generating, based on the determined type of the frame to be processed, the artificial neural network instance based on one artificial neural network model. When the memory capacity of the AI dedicated core or the AI accelerator is sufficient, a plurality of artificial neural network instances based on a plurality of artificial neural network models for image processing may be generated, and the super resolution process may be performed by transferring a suitable frame to the plurality of artificial neural network instances.

Figure 6:
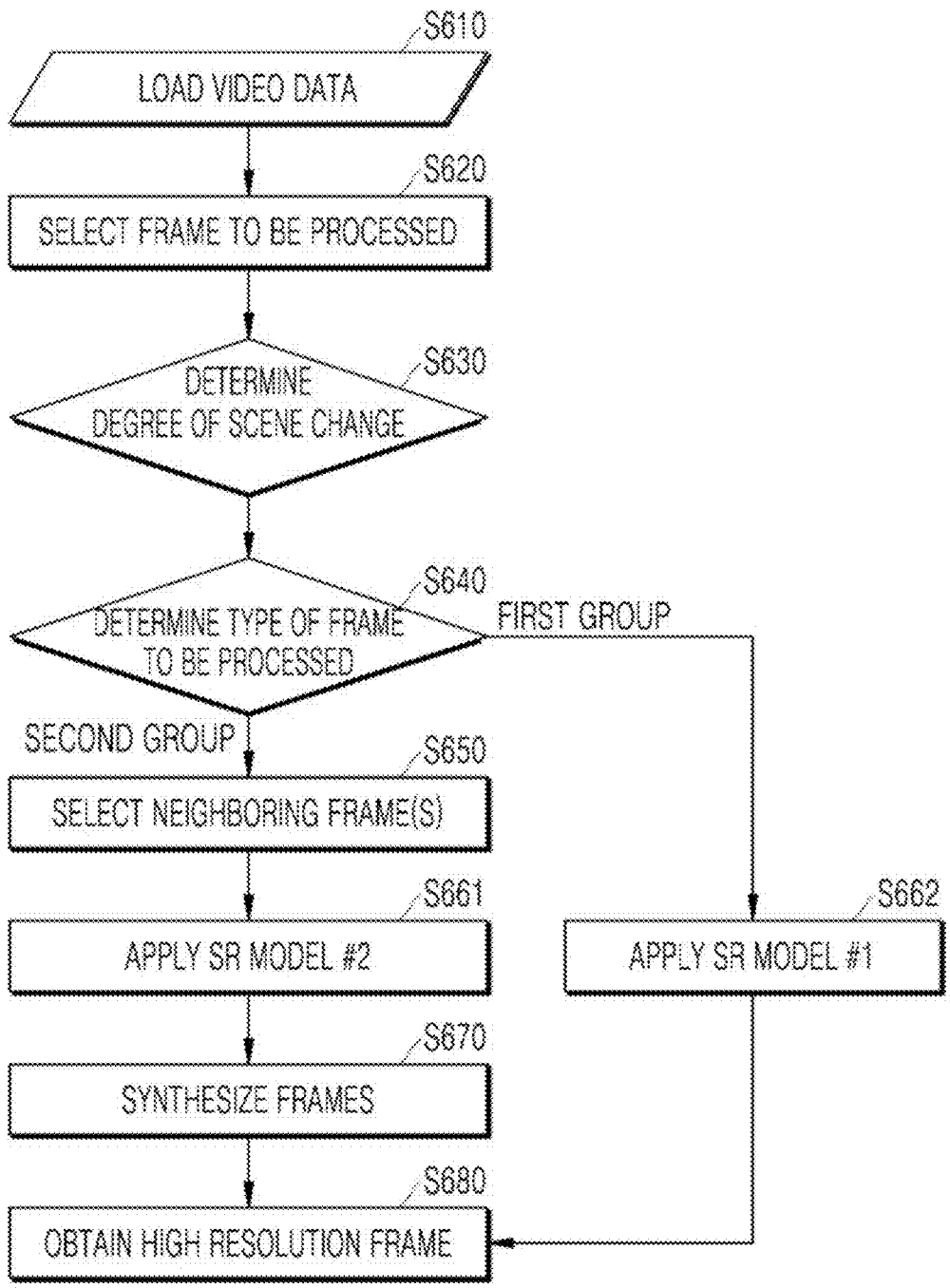
FIG. 6 is a sequence diagram illustrating a method for enhancing video frame resolution according to one embodiment of the present disclosure.

FIG. 6 is a sequence diagram illustrating a method for enhancing video frame resolution according to another embodiment of the present disclosure.

In addition, FIGS. 7 to 10 are views illustrating a process of performing, on video data, the method for enhancing video frame resolution according to one embodiment of the present disclosure as described with reference to FIG. 6. In the following description, a description overlapping with those of FIGS. 1 to 5 will be omitted.

The embodiments of the present disclosure described with reference to FIGS. 8 to 10 assumes that an apparatus for enhancing a frame resolution stores two super resolution models having different complexity, and that super resolution model 1 has higher complexity than super resolution model 2.

The apparatus for enhancing video frame resolution may have the same configuration as the electronic device 100 described with reference to FIG. 1. First, the apparatus for enhancing video frame resolution may load video data 700 (S610).

Figure 7:
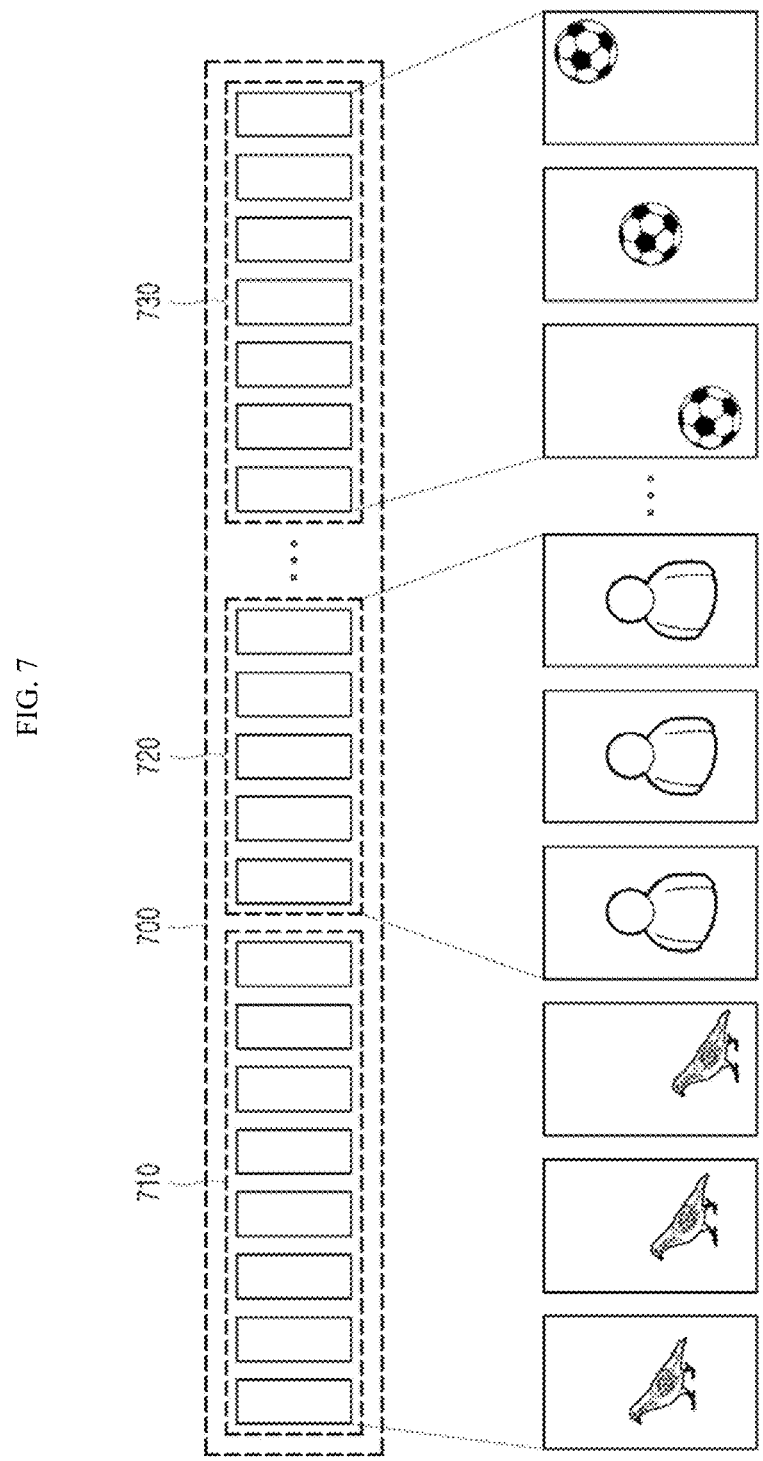
FIGS. 7 to 10 are views illustrating a process of performing, on a video, a method for enhancing video frame resolution, according to one embodiment of the present disclosure.

Referring to FIG. 7, the video data 700 may be a video composed of frames having different scene change rates. For example, the video data 700 may be video data which is composed of frames 710 having a scene change rates within a predetermined range of reference scene change rate, frames 720 having a scene change rates slower than the reference rate, such as news broadcasts, and frames 730 having a scene change rates faster than the reference rate, such as sports broadcasts.

The apparatus for enhancing video frame resolution may apply, based on a result of determining the degree of scene change of the frame, the super resolution models having different complexity according to the degree of scene change.

For example, when the super resolution model having high complexity is applied to frames corresponding to the preset periodic interval, the apparatus for enhancing video frame resolution may change the periodic interval for the frames having a slow scene change rate to be shorter, or change the periodic interval for the frames having a fast scene change rate to be longer. Accordingly, a section composed of the frames having the slow scene change rate may have many frames to which the super resolution model having high complexity is applied, whereas a section composed of the frames having the fast scene change rate may have a few frames to which the super resolution model having high complexity is applied. A detailed explanation is as follows.

The apparatus for enhancing video frame resolution may select a frame to be processed, according to an order of the loaded video data (S620).

The apparatus for enhancing video frame resolution may apply the super resolution model for a single frame to frames 741, 751, 761 corresponding to a periodic interval of the video data 700, and apply the super resolution model for multiple frames to the remaining frames 742, 752, 762 of the video data 700. When the multiple frames super resolution is applied, the plurality of frames may be loaded into a buffer and then be applied with the super resolution model.

The apparatus for enhancing video frame resolution may determine the degree of scene change by analyzing a change of the frame to be processed relative to a previous frame. The degree of scene change may be determined based on a statistical distribution change of a subtraction image of the frame to be processed relative to the previous frame, or a degree of movement of an object recognized in the frames.

In determining the degree of scene change based on the degree of movement of the object, it is determined whether the object recognized in the frame to be processed is the same as an object recognized in the previous frame. Subsequently, when it is determined that the above two objects are the same, the degree of scene change may be determined by comparing the degree of movement of that object between the previous frame and the frame to be processed with a reference degree of movement. Neural networks for object recognition are formed by using various models, such as convolutional neural network (CNN), fully-convolutional neural network (FCNN), region-based convolutional neural network (R-CNN), and you only look once (YOLO).

The apparatus for enhancing video frame resolution may detect a scene change, and determine a scene change rate only within frames that are regarded as the same scene. For example, in the situation of the video data configured as shown in FIG. 7, a first group of frames 710, a second group of frames 720, and a third group of frames 730 may be regarded as different scenes, and thus the degree of scene change may not need to be determined between a last frame of each group and a first frame of the next group.

A scene transition refers to a physical or logical transition to a frame having completely different contents during, for example, a camera movement, an image effect, or a video editing process. An example of the screen transition may include a transition from a broadcast screen with an announcer to a field screen with a reporter, in a news program.

According to physical characteristics of a method for distinguishing the scene transition, the scene transition may be detected based on a color of the frame or by using, for example, motion vectors, edge information, and pixel differences, and known scene transition technologies may be used without particular limitation.

However, the scene change does not refer to a transition to a scene having completely different content. That is, an example of the scene change may simply include a moving object in frames composed of scenes having similar contents, or a camera angle which gradually changes.

Figure 8:
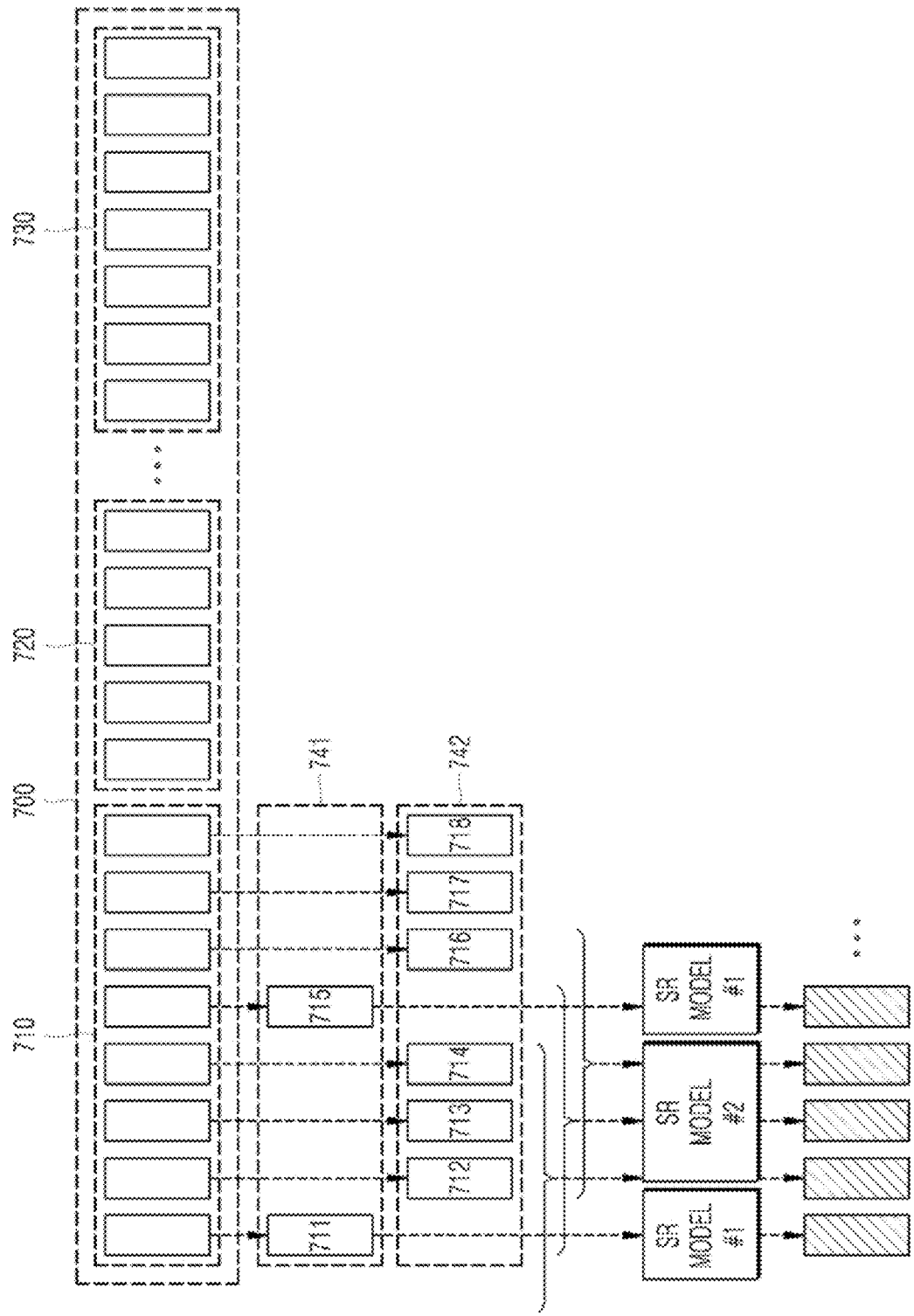

Referring to FIG. 8, when the scene change between the frames of the first group of frames 710 is within a reference scene change range, the apparatus for enhancing video frame resolution may, based on a preset periodic interval, apply super resolution model 1 having high complexity to the frames 711, 715 corresponding to the periodic interval, and apply super resolution model 2 having low complexity to the frames 712, 713, 714, 716, 717, 718 not corresponding to the periodic interval. In addition, when super resolution model 2 having low complexity is applied as described above, obtaining the high resolution frame may be complemented by applying the multiple images super resolution model.

Figure 9:
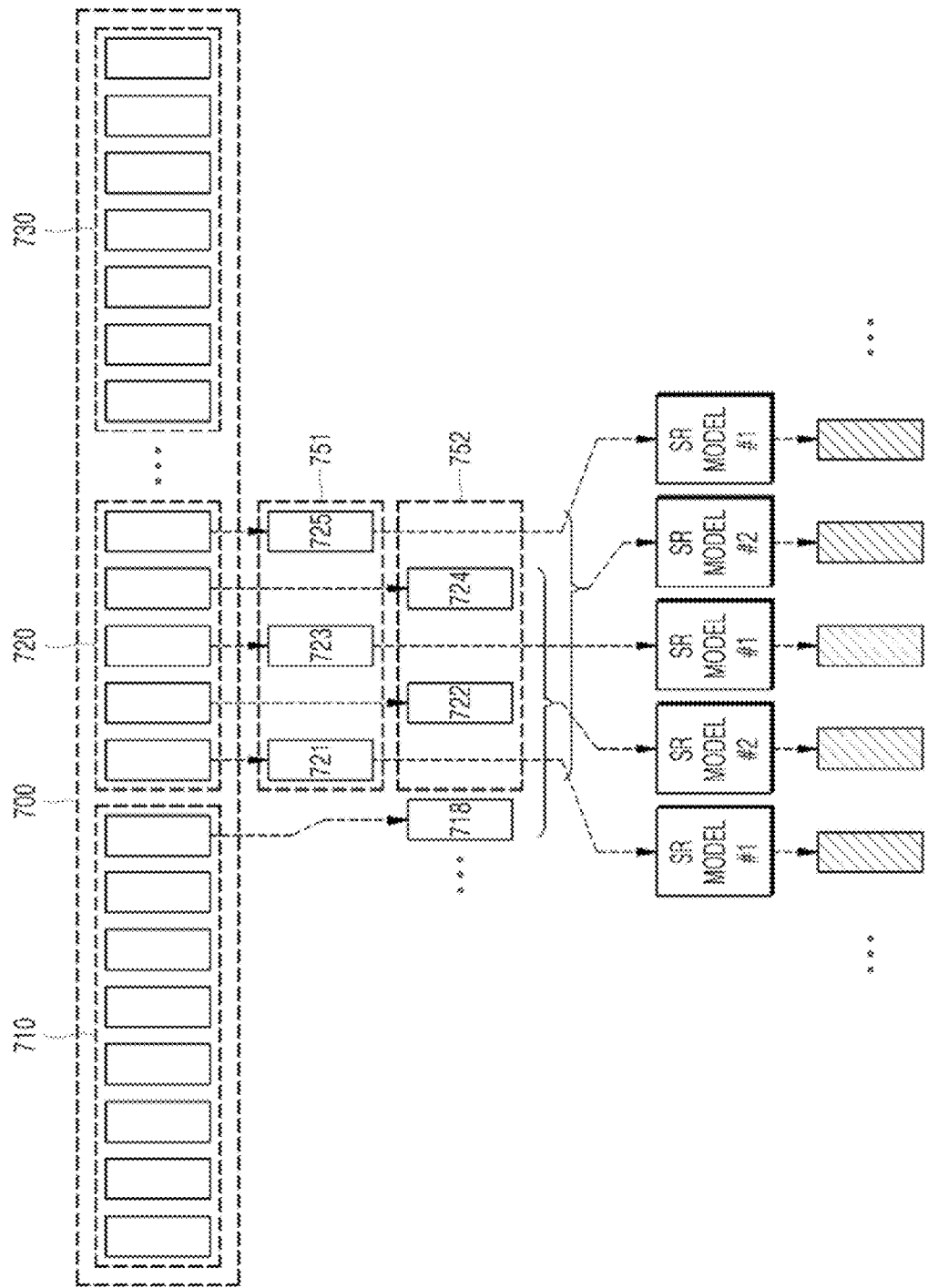

Referring to FIGS. 7 and 9, when a scene of a first frame 721 of the second group of frames 720 corresponds to the scene transition relative to a last frame 718 of the previous group of frames 710, the apparatus for enhancing video frame resolution may again determine the periodic interval.

The apparatus for enhancing video frame resolution may determine the degree of scene change of the frame to be processed relative to the previous frame (S630). As a result, when the degree of scene change is out of the reference range, the apparatus for enhancing video frame resolution may change the reference interval. Subsequently, the apparatus for enhancing video frame resolution may determine a type of the frame to be processed, based on the changed reference interval (S640).

For example, referring to FIGS. 7 and 9, when the degree of scene change between the first frame 721 and a second frame 722 of the second group of frames 720 is less than the reference range, the apparatus for enhancing video frame resolution may apply the super resolution model with high complexity to the frames more frequently by changing the reference interval to be shorter.

Figure 10:
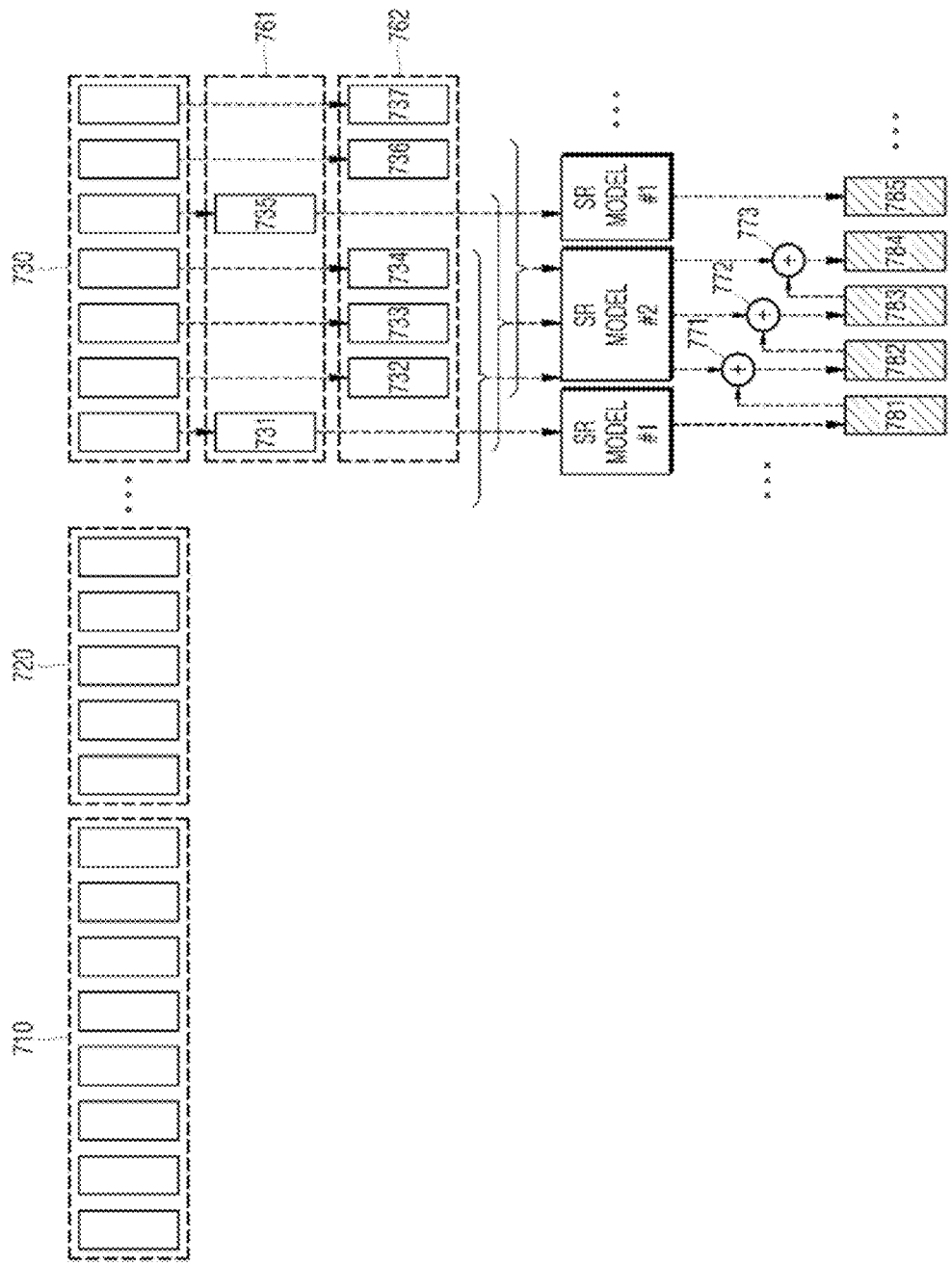

As another example, referring to FIGS. 7 and 10, when the degree of scene change between a first frame 731 and a second frame 732 of the third group of frames 730 is greater than the reference range, the apparatus for enhancing video frame resolution may apply the super resolution model with high complexity to the frames less frequently by changing the reference interval to be longer.

Therefore, by changing, based on the scene change rate of the frame, the frame to which the super resolution model with high complexity is applied, the high resolution frame, in which viewers may not notice a drop in image quality, may be obtained without applying the super resolution model having high complexity to all frames of the video data.

When the super resolution model with low complexity is applied, the apparatus for enhancing video frame resolution may apply the multiple images super resolution model that may use (S650) the neighboring frames of the frame to be processed together as the input (S661).

As one embodiment, when the super resolution model having low complexity is applied because the degree of scene change is greater than the reference range, the apparatus for enhancing video frame resolution may obtain a high resolution frame 782 by synthesizing 771 (S670) a result of applying the super resolution model having low complexity to the frame 732 to be processed and a result 781 of applying the super resolution model to the previous frame 731 (S680). The synthesization of the image and the result of applying the super resolution model to the previous frame may be a synthesization reflecting a weighting factor.

Figure 11:
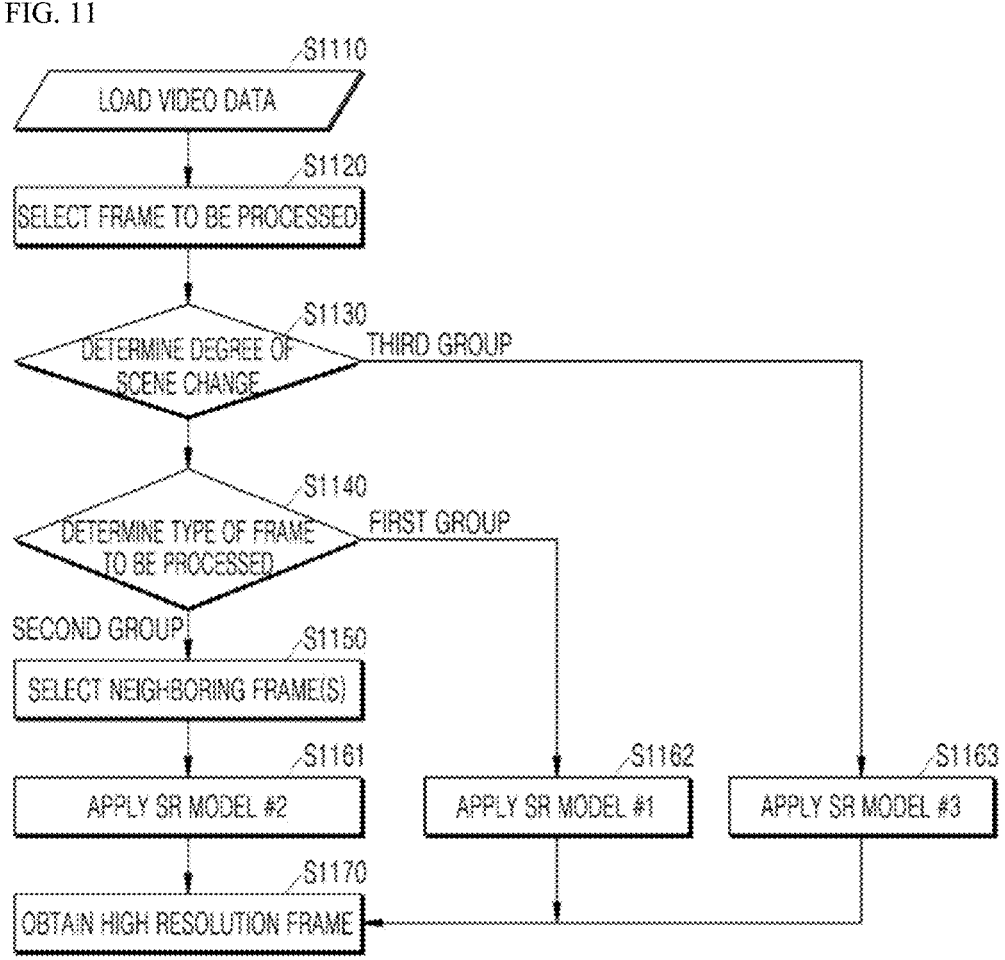
FIG. 11 is a sequence diagram illustrating a method for enhancing video frame resolution according to one embodiment of the present disclosure.

FIG. 11 is a sequence diagram illustrating a method for enhancing video frame resolution according to another embodiment of the present disclosure.

Figure 12:
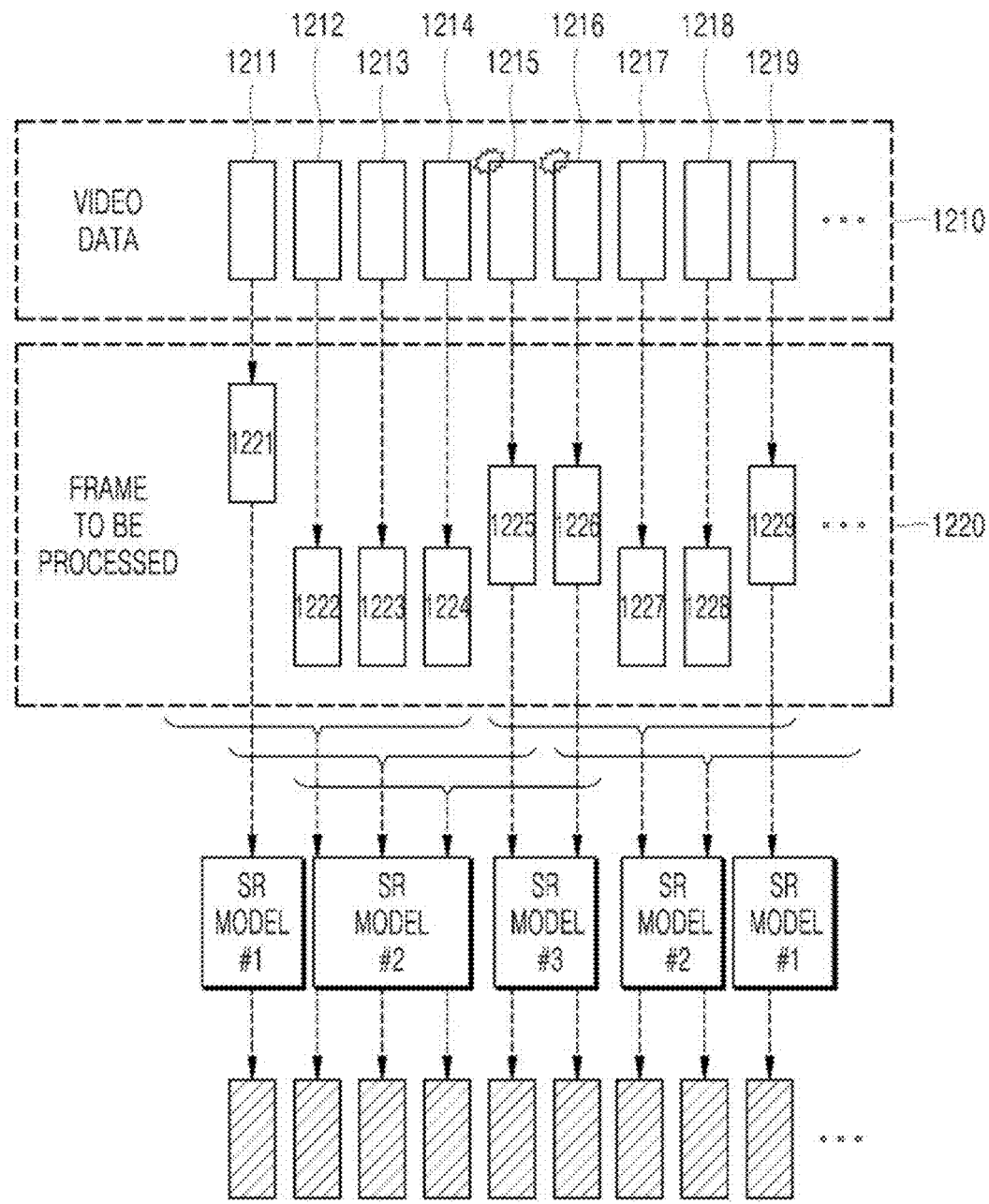
FIG. 12 is a view illustrating a process of performing, on a video, a method for enhancing video frame resolution, according to one embodiment of the present disclosure.

In addition, FIG. 12 is a view illustrating a process of performing, on video data, the method for enhancing video frame resolution according to one embodiment of the present disclosure as described with reference to FIG. 11. In the following description, a description overlapping with those of FIGS. 1 to 10 will be omitted.

The embodiment of the present disclosure described with reference to FIGS. 11 and 12 assumes that the apparatus for enhancing video frame resolution stores three super resolution models having different complexity, and that the complexity is higher in the order of super resolution model 3, super resolution model 1, and super resolution model 2.

The apparatus for enhancing video frame resolution may have the same configuration as the electronic device 100 described with reference to FIG. 1. First, the apparatus for enhancing video frame resolution may load video data 1210 (S1110).

Referring to FIGS. 11 and 12, since there is no previous frame of a first frame 1211, there is no scene change (S1120). Subsequently, as a result of determining, based on the preset periodic interval, the type of the frame to be processed (S1140), the apparatus for enhancing video frame resolution may determine the first frame as a frame 1221 to which super resolution model 1 having high complexity is to be applied (S1140).

It is determined that degrees of scene change of a second frame 1212 to a fourth frame 1214 relative to the previous frame are not out of the reference range (S1120). Subsequently, as a result of determining, based on the preset periodic interval, the type of the frame to be processed (S1140), the apparatus for enhancing video frame resolution may determine the second frame 1212 to the fourth frame 1214 as frames 1222, 1223, 1224 to which super resolution model 2 having low complexity is to be applied (S1140). When the super resolution model with low complexity is applied, the apparatus for enhancing video frame resolution may apply the multiple images super resolution model that may use (S1150) the neighboring frames of the frame to be processed together as the input (S1161).

As a result of determining that the degrees of scene change of a fifth frame 1215 and a sixth frame 1216 relative to the previous frame are out of the reference range (S1120), the apparatus for enhancing video frame resolution may determine the fifth frame 1215 and the sixth frame 1216 as frames 1225, 1226 to which super resolution model 3 having highest complexity is to be applied, and obtain high resolution frames by performing a super resolution process on the fifth frame 1215 and the sixth frame 1216 (S1170).

Therefore, in the situation of a CCTV camera or a security camera for a parked car for which usually there is almost no scene change and which does not attract a user's attention, but attracts the user's attention when there is a scene change, resolution enhancement desired by the user may be achieved by applying the super resolution models according to a general method when there is no scene change, but by applying the super resolution model having the greatest resolution enhancement effect to the frame having the scene change.

For example, the apparatus for enhancing video frame resolution may be predetermined to apply super resolution model 1 having high complexity to the frames 521 corresponding to the preset periodic interval, but to apply super resolution model 2 having lower complexity than super resolution model 1 to the frames 522 not corresponding to the periodic interval.

The present disclosure described above may be implemented as a computer-readable code in a medium on which a program is recorded. The computer-readable medium may include all kinds of recording devices in which computer-readable data is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc. Moreover, the computer may include the processor 180 of a terminal.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the terms "a/an" and "the" include both singular and plural references, unless the context clearly states otherwise. Also, it should be understood that any numerical range recited in the present disclosure is intended to include all sub-ranges subsumed therein (unless expressly indicated otherwise) and accordingly, the disclosed numeral ranges include every individual value between the minimum and maximum values of the numeral ranges.

The steps constituting the method according to the present disclosure may be performed in an appropriate order unless a specific order is described or otherwise specified. That is, the present disclosure is not necessarily limited to the order in which the steps are recited. All examples described in the present disclosure or the terms indicative thereof ("for example," "such as") are merely to describe the present disclosure in greater detail. Therefore, it should be understood that the scope of the present disclosure is not limited to the example embodiments described above or by the use of such terms unless limited by the appended claims. In addition, it should be apparent to those skilled in the art that various alterations, combinations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for enhancing video frame resolution, the method comprising:
    loading video data including a plurality of frames having low resolution;
    selecting artificial neural network models, from a group of artificial neural network models, for applying image processing to the plurality of frames; and
    generating high resolution frames respectively corresponding to the plurality of frames according to corresponding selected artificial neural network models among the artificial neural network models,
    wherein the artificial neural network models include at least a first artificial neural network model and a second artificial neural network model having a different complexity than the first artificial neural network model,
    wherein one of the high resolution frames is generated based on the first artificial neural network model, and another one of the high resolution frames is generated based on the second artificial neural network model,
    wherein the selecting the artificial neural network models for applying the image processing comprises:
    selecting the first artificial neural network model for applying image processing to a first group of low resolution frames corresponding to a preset periodic interval, among the plurality of frames; and
    selecting the second artificial neural network model for applying image processing to a second group of low resolution frames that do not correspond to the preset periodic interval, among the plurality of frames,
    wherein the first artificial neural network model has a higher complexity than the second artificial neural network model, and
    wherein the generating the high resolution frames comprises:
    determining whether a frame to be processed among the plurality of frames is included the first group of low resolution frames or the second group of low resolution frames; and
    in response to determining that the frame is included the second group of low resolution fames, inputting the frame and neighboring frames within a preset neighboring interval from the frame to the second artificial neural network model to generate a high resolution frame corresponding to the frame.

2. The method according to claim 1, further comprising:
    determining a degree of scene change of a frame to be processed among the plurality of frames, relative to a previous frame, prior to the selecting the artificial neural network models for the image processing,
    wherein the selecting the artificial neural network models for the image processing further comprises:
    determining whether to set the frame to be processed as a reference frame of the preset periodic interval, based on the degree in scene change.

3. The method according to claim 1, wherein the neighboring frames are within the preset neighboring interval and have a degree of scene change being less than or equal to a predetermined criterion, relative to the frame to be processed.

4. The method according to claim 1, wherein the selecting the artificial neural network models for applying the image processing comprises:
    determining a degree of scene change of a frame to be processed among the plurality of frames, relative to a previous frame; and
    changing the preset periodic interval based on the degree of scene change.

5. The method according to claim 4, wherein the determining the degree of scene change of the frame to be processed comprises:
    identifying an object in the frame;
    determining a degree of movement of the object relative to the previous frame; and
    changing the preset periodic interval based on the degree of movement of the object.

6. The method according to claim 4, wherein the generating the high resolution frames comprises:
    determining whether the frame is included in the first group of low resolution frames or the second group of low resolution frames;
    in response to determining that the frame is included the second group of low resolution fames, inputting the frame and neighboring frames within a preset neighboring interval from the frame to the second artificial neural network model to obtain a temporary high resolution frame corresponding to the frame; and
    generating a high resolution frame corresponding to the frame by synthesizing the temporary high resolution frame and a previous high resolution frame obtained by processing the previous frame, based on the degree of scene change.

7. The method according to claim 1, wherein the selecting the artificial neural network models for applying the image processing comprises:
    determining a degree of scene change of a frame to be processed, relative to a previous frame;
    in response to the degree of scene change being equal to or greater than a predetermined criterion, selecting a third artificial neural network model for applying image processing to the frame; and generating a high resolution frame corresponding to the frame based on a third artificial neural network model,
wherein the third artificial neural network model has a higher complexity than the first artificial neural network model.

8. The method according to claim 1, further comprising:
obtaining the video data by decoding compressed video data, prior to the loading the video data,
wherein the selecting the artificial neural network models for image processing comprises:
selecting the first artificial neural network model to be applied to a third group of frames decoded from an intra frame of the compressed video data, among the plurality of frames, and
selecting the second artificial neural network model to be applied to a fourth group of frames decoded from an inter frame of the compressed video data, among the plurality of frames.

9. The method according to claim 8, wherein the generating the high resolution frame comprises:
selecting neighboring frames within a neighboring interval from a frame of the fourth group of frames, wherein the neighboring interval is set based on at least one frame of the third group of frames being included in the neighboring frames; and
obtaining the high resolution frame by utilizing, as inputs to the artificial neural network models for image processing, the at least one frame and the neighboring frames.

10. A non-transitory computer-readable recording medium having a stored computer program that, when executed by a computer, causes the computer to execute the method according to claim 1.

11. An apparatus for enhancing video frame resolution, the apparatus comprising:
a processor; and
a memory configured to be electrically coupled to the processor and to store at least one instruction executed in the processor and parameters of a group of artificial neural network models for image processing,
wherein the processor is configured to:
load video data including a plurality of frames having low resolution,
select artificial neural network models, from the group of artificial neural network models, for applying image processing to the plurality of frames, and
generate high resolution frames respectively corresponding to the plurality of frames according to corresponding selected artificial neural network models among the artificial neural network models,
wherein the artificial neural network models include at least a first artificial neural network model and a second artificial neural network model having a different complexity than the first artificial neural network model,
wherein one of the high resolution frames is generated based on the first artificial neural network model, and another one of the high resolution frames is generated based on the second artificial neural network model,
wherein the processor is further configured to:
select the first artificial neural network model for applying image processing to a first group of low resolution frames corresponding to a preset periodic interval, among the plurality of frames,
select the second artificial neural network model for applying image processing to a second group of low resolution frames that do not correspond to the preset periodic interval, among the plurality of frames,
determine whether a frame to be processed among the plurality of frames is included the first group of low resolution frames or the second group of low resolution frames, and
in response to determining that the frame is included the second group of low resolution fames, input the frame and neighboring frames within a preset neighboring interval from the frame to the second artificial neural network model to generate a high resolution frame corresponding to the frame,
wherein the first artificial neural network model has a higher complexity than the second artificial neural network model.

12. An apparatus for enhancing video frame resolution, the apparatus comprising:
a processor; and
a memory configured to be electrically coupled to the processor and to store at least one instruction executed in the processor and parameters of artificial neural networks for image processing,
wherein the processor is configured to:
load a frame to be processed from video data including a plurality of frames having low resolution,
select artificial neural network models, from a group of artificial neural network models, for applying image processing to the plurality of frames, and
generate a high resolution frame by transferring the frame to be processed to an artificial neural network model instance generated based on one of a plurality of artificial neural network models for image processing having different complexities,
wherein the processor is further configured to:
in response to determining that the frame is included in a first group of low resolution frames corresponding to a preset periodic interval, among the plurality of frames, generate a first artificial neural network model instance based on a first artificial neural network model among the plurality of artificial neural network models for image processing, and generate the high resolution frame based on the first artificial neural network model instance, and
in response to determining that the frame is included in a second group of low resolution frames that do not correspond to the preset periodic interval, among the plurality of frames, generate a second artificial neural network model instance based on a second artificial neural network model among the plurality of artificial neural network models for image processing, and generate the high resolution frame based on the second artificial neural network model instance by transferring the frame and neighboring frames within a preset neighboring interval from the frame to the second artificial neural network model instance,
wherein the first artificial neural network model has a higher complexity than the second artificial neural network model.

* * * * *